United States Patent [19]

Hartman et al.

[11] Patent Number: 5,537,977
[45] Date of Patent: Jul. 23, 1996

[54] METHOD OF ESTIMATING EXHAUST GAS RECIRCULATION IN AN INTAKE MANIFOLD FOR AN INTERNAL COMBUSTION ENGINE

[75] Inventors: Peter G. Hartman, Bloomfield; Keith L. Jones, Woodhaven; Thomas A. Larson, Bloomfield Hills; Gregory T. Weber, Commerce Township, all of Mich.

[73] Assignee: Chrysler Corporation, Auburn Hills, Mich.

[21] Appl. No.: 380,865

[22] Filed: Jan. 30, 1995

[51] Int. Cl.$^6$ ........................................ F02P 5/14
[52] U.S. Cl. .............................................. 123/422
[58] Field of Search ........................ 123/422, 568, 123/571, 681, 676, 698, 430, 412, 675; 364/431

[56] References Cited

U.S. PATENT DOCUMENTS

| | | | |
|---|---|---|---|
| 4,142,493 | 3/1979 | Schira et al. | 123/422 |
| 4,161,929 | 7/1979 | Nohira et al. | 123/422 |
| 4,164,032 | 8/1979 | Nohira et al. | 364/431 |
| 4,248,187 | 2/1981 | Matsui et al. | 123/568 |
| 4,453,379 | 6/1984 | Kawamura et al. | 60/278 |
| 4,454,853 | 6/1984 | Hasegawa | 123/571 |
| 4,463,741 | 8/1984 | Shinoda | 123/571 |
| 4,466,416 | 8/1984 | Kawamura | 123/571 |
| 4,485,794 | 12/1984 | Kimberley et al. | 123/569 |
| 4,553,518 | 11/1985 | Takao et al. | 123/478 |
| 4,614,175 | 9/1986 | Asayama | 123/571 |
| 4,664,090 | 5/1987 | Kabasin | 123/494 |
| 4,723,528 | 2/1988 | Tamura | 123/571 |
| 4,848,303 | 7/1989 | Fujimoto et al. | 123/571 |
| 4,987,888 | 1/1991 | Funabashi et al. | 123/422 |
| 5,003,950 | 4/1991 | Kato et al. | 123/422 |
| 5,058,550 | 10/1991 | Nagano et al. | 123/422 |
| 5,172,550 | 12/1992 | Takeshima | 60/278 |
| 5,261,373 | 11/1993 | Ohsuga et al. | 123/430 |
| 5,331,934 | 7/1994 | Asama et al. | 123/417 |
| 5,423,307 | 6/1995 | Okawa et al. | 123/698 |
| 5,445,127 | 8/1995 | Cullen et al. | 123/422 |

Primary Examiner—Raymond A. Nelli
Attorney, Agent, or Firm—Margaret A. Dobrowitsky

[57] ABSTRACT

A method of estimating exhaust gas recirculation in an intake manifold for an internal combustion engine includes the steps of determining a volumetric efficiency value of the intake manifold, determining whether a speed of the engine is accelerating, getting a manifold unfilling constant if the speed of the engine is not accelerating, getting a manifold filling constant if the speed of the engine is accelerating, calculating a K-factor based on the volumetric efficiency value and either the manifold filling constant or manifold unfilling constant, and using the K-factor to modify spark of the engine.

6 Claims, 2 Drawing Sheets

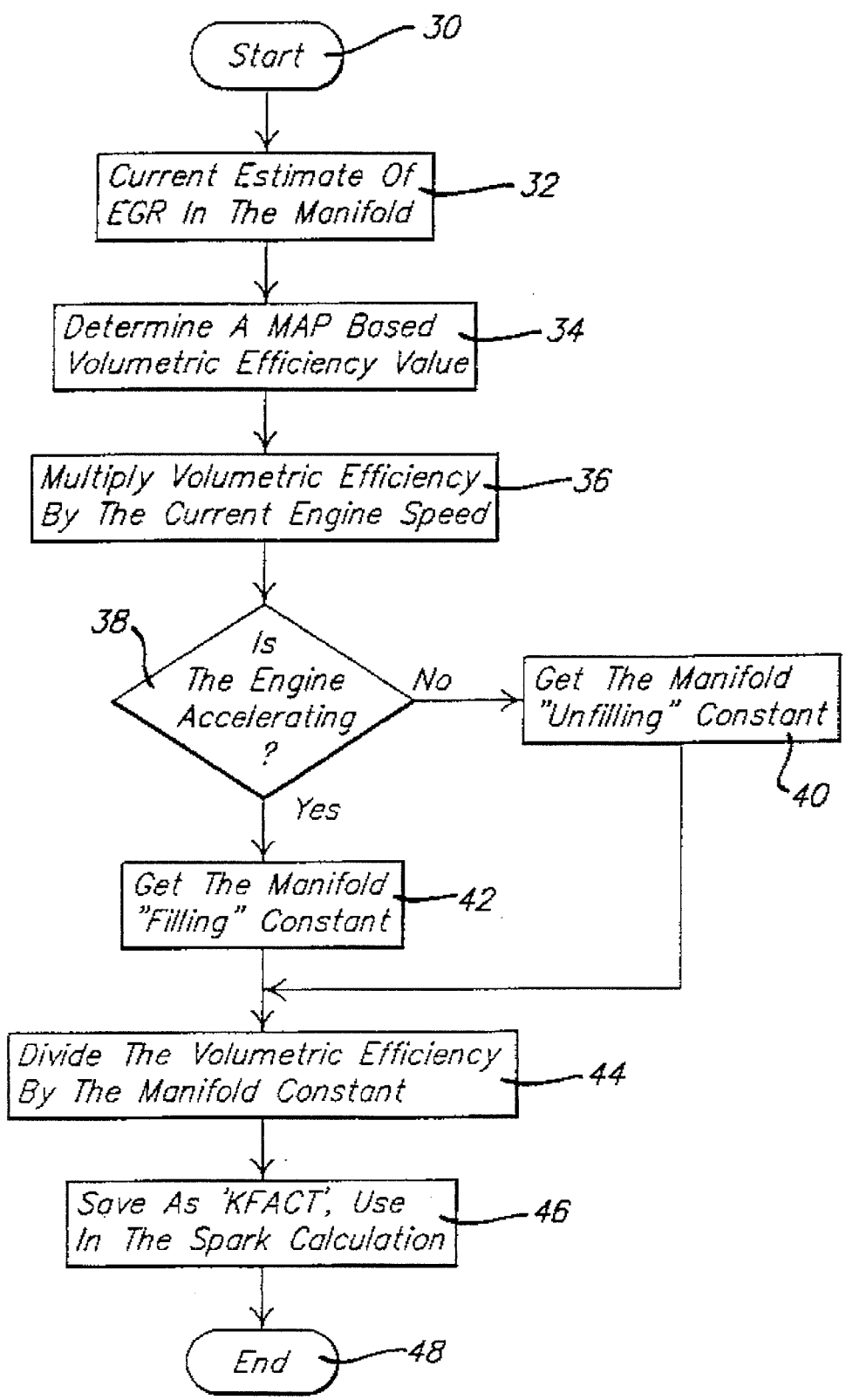

METHOD OF ESTIMATING EXHAUST GAS RECIRCULATION IN AN INTAKE MANIFOLD FOR AN INTERNAL COMBUSTION ENGINE

BACKGROUND OF THE INVENTION

1. Field of the Invention

The present invention relates generally to exhaust gas recirculation for internal combustion engines and, more particularly, to a method of estimating exhaust gas recirculation in an intake manifold for an internal combustion engine.

2. Description of the Invention

Motor vehicles typically include an internal combustion engine for powering the vehicles. Commonly, these engines have an intake manifold, an exhaust manifold and an exhaust gas recirculation (EGR) system recirculating a part of exhaust gases from the exhaust manifold to the intake manifold for controlling emission of noxious components in the exhaust gases from the engine. Currently, such an EGR system is an exhaust back-pressure controlled valve that is turned ON and OFF with an EGR vacuum solenoid. When there is back-pressure and power to the EGR vacuum solenoid, the EGR valve is opened. The EGR flow is essentially proportional to exhaust back pressure and thus engine flow.

One disadvantage of the above EGR system is that this system has no electronic control to determine when the EGR valve will open or how much. With the onset of lower tailpipe emissions and higher fuel economy regulations, there is a need in the art to provide more precise control of the EGR system by estimating exhaust gas recirculation in an intake manifold for an internal combustion engine.

SUMMARY OF THE INVENTION

It is, therefore, one object of the present invention to provide more precise control of EGR for an internal combustion engine.

It is another object of the present invention to provide a method of estimating exhaust gas recirculation in an intake manifold for an internal combustion engine.

To achieve the foregoing objects, the present invention is a method of estimating exhaust gas recirculation in an intake manifold for an internal combustion engine. The method includes the steps of determining a volumetric efficiency value for an intake manifold of an internal combustion engine and determining whether a speed of the engine is accelerating. The method also includes the steps of getting a manifold unfilling constant if the speed of the engine is not accelerating and getting a manifold filling constant if the speed of the engine is accelerating. The method further includes the steps of calculating a K-factor based on the volumetric efficiency value and either the manifold filling constant or the manifold unfilling constant and using the K-factor to modify spark of the engine.

One advantage of the present invention is that a method is provided for more precise control of EGR in an intake manifold for an internal combustion engine. Another advantage of the present invention is that a method is provided for estimating exhaust gas recirculation in an intake manifold for an internal combustion engine.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 2 is a flowchart of a method of estimating exhaust gas recirculation in an intake manifold, according to the present invention, for the exhaust gas recirculation system and internal combustion engine of FIG. 1.

DESCRIPTION OF THE PREFERRED EMBODIMENT(S)

Figure 1:
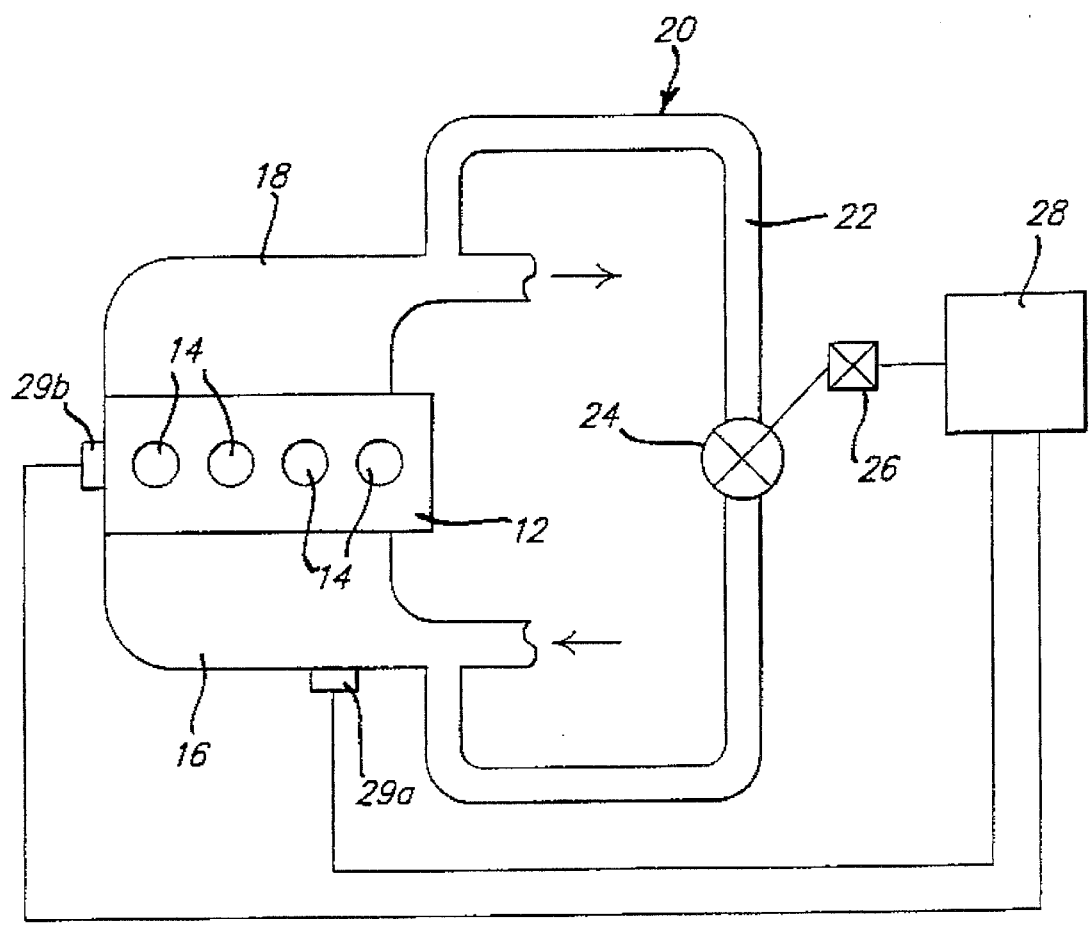
FIG. 1 is a schematic diagram of an exhaust gas recirculation system illustrated in operational relationship with an internal combustion engine.

Referring to FIG. 1, an internal combustion engine 10 is shown for a vehicle such as an automotive vehicle (not shown). The engine 10 has an engine block 12 with a plurality of cylinders 14 for combusting air and fuel therein. The engine 10 includes an intake manifold 16 connected to the cylinders 14 for allowing air flow into the cylinders 14. The engine 10 also includes an exhaust manifold 18 connected to the cylinders 14 for allowing exhaust gases to exit from the cylinders 14.

The engine 10 further includes an exhaust gas recirculation (EGR) system, generally indicated at 20, for recirculating a part of the exhaust gases from the exhaust manifold 18 to the intake manifold 16 of the engine 10. The EGR system 20 includes a passage 22 connecting the intake manifold 16 and exhaust manifold 18. The EGR system 20 also includes an EGR valve 24 disposed in a portion of the passage 22. Preferably, the EGR valve 24 is a pintle type valve which varies the flow of exhaust gases through the passage 22 by the amount the valve is opened. The EGR system 20 includes an electronic vacuum regulator (EVR) 26 to regulate the amount of vacuum going to the EGR valve 24. The EGR system 20 further includes an electronic control unit (ECU) 28 connected to the EVR 26 to electronically drive the EVR 26. The EGR system 20 includes a manifold absolute-pressure (MAP) sensor 29a connected to the intake manifold 16 and to the ECU 28 to sense MAP of the engine 10. The EGR system 20 also includes a crankshaft sensor 29b connected to the engine 10 and to ECU 28 to sense engine speed (RPM) of the engine 10. It should be appreciated that by varying the duty cycle to the EVR 26, the amount the EGR valve 24 is open can be controlled. It should also be appreciated that the ECU 28 has a microprocessor and memory as is known in the art.

Referring to FIG. 2, a method of estimating exhaust gas recirculation in the intake manifold 16 for the internal combustion engine 10, according to the present invention, is shown. The methodology starts in bubble 30 and advances to block 32. In block 32, the methodology obtains a current estimate of EGR in the intake manifold 16. The ECU 28 adds the product of a previous calculated estimate of EGR in the intake manifold 16 multiplied by a K-factor to a product of a desired percentage of EGR in the intake manifold 16 multiplied by the difference of one (1) minus the K-factor. The K-factor has a value between zero (0) and one (1) and is a function of engine speed (RPM) to be described. It Should be appreciated that the values for the previous calculated estimate of EGR and the K-factor are initialized with a zero (0) value.

After block 32, the methodology advances to block 34 and determines a MAP based volumetric efficiency value. The ECU 28 obtains current MAP value from a signal from the MAP sensor 29a. The ECU 28 obtains the volumetric efficiency value from a 2D look-up table of empirically derived values of MAP versus volumetric efficiency stored in memory of the ECU 28 using the current MAP value. After block 34, the methodology advances to block 36 and multiplies the volumetric efficiency value by a current engine speed (RPM). The ECU 28 obtains a current engine speed value from a signal from the crankshaft sensor 29b. The methodology then advances to diamond 38 and determines whether the speed of the engine 10 is accelerating. The ECU 28 makes this determination based on signals from the engine speed sensor 29b.

If the engine 10 is not accelerating, the methodology advances to block 40 and gets a manifold "unfilling" constant. If the engine 10 is accelerating, the methodology advances to block 42 and gets a manifold "filling" constant. The ECU 28 obtains these manifold constants from a look-up table of empirically derived values of manifold constants versus MAP stored in memory of the ECU 28 using the current MAP value. After either block 40 or block 42, the methodology advances to block 44 and divides a product of the volumetric efficiency value multiplied by the engine speed by the obtained manifold constant of block 40 or block 42. The methodology then advances to block 46 and saves this quotient or value as "K-factor" and uses the K-factor in a spark calculation to modify spark to the engine 10. The estimate of EGR percentage in the intake manifold 16 and the target-EGR percentage are used as a multiplier to calculate the amount of spark advance to be added to a base spark advance. After block 46, the methodology advances to bubble 48 and ends the routine.

Due to a lag time of the intake manifold 16 filling to a target percentage of EGR when the EGR valve 24 is opening or closing, the method, according to the present invention, estimates an instantaneous percentage of EGR in the intake manifold 16 so that operation of the EGR valve 24 can be optimized. The method uses the K-factor which is a function of the volumetric efficiency and engine speed (RPM) of the engine 10 and is used to estimate a time constant of the intake manifold 16 at a given RPM. The K-factor has a higher value at lower RPM when the intake manifold 16 takes longer to fill and a lower value at higher RPM when the intake manifold 16 takes less time to fill. It should be appreciated that a different K-factor is used depending on whether the intake manifold 16 is filling or emptying.

Accordingly, the method provides more accurate control of the EGR system by estimating the EGR in the intake manifold 16 for the engine 10. The method estimates the current or instantaneous percentage of EGR in the intake manifold 16 due to the lag time of the intake manifold fitting to the target percentage of EGR when the EGR valve is opening or closing.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of estimating exhaust gas recirculation in an intake manifold for an internal combustion engine, said method comprising the steps of:

determining a volumetric efficiency value of an intake manifold for an internal combustion engine;

determining whether a speed of the engine is accelerating;

getting a manifold unfilling constant if the speed of the engine is not accelerating;

getting a manifold filling constant if the speed of the engine is accelerating;

calculating a K-factor based on the volumetric efficiency value and either the manifold filling constant or manifold unfilling constant; and using the K-factor to modify spark of the engine.

2. A method as set forth in claim 1 including the step of multiplying the volumetric efficiency value by a current engine speed prior to said step of determining whether the engine is accelerating.

3. A method as set forth in claim 1 including the step of calculating a current estimate of exhaust gas recirculation in the intake manifold prior to said step of determining the volumetric efficiency value.

4. A method as set forth in claim 1 wherein said step of calculating comprises dividing a product of the volumetric efficiency value multiplied by a speed of the engine by either the manifold filling constant or manifold unfilling constant.

5. A method as set forth in claim 1 wherein said step of determining the volumetric efficiency value comprises using a current manifold absolute pressure to look-up a volumetric efficiency value from a table.

6. A method of estimating exhaust gas recirculation in an intake manifold for an internal combustion engine, said method comprising the steps of:

calculating a current estimate of exhaust gas recirculation in an intake manifold for an internal combustion engine;

determining a volumetric efficiency value for the intake manifold from a look-up table using a current manifold absolute pressure;

determining whether a speed of the engine is accelerating;

getting a manifold unfilling constant if the speed of the engine is not accelerating;

getting a manifold filling constant if the speed of the engine is accelerating;

dividing a product of the volumetric efficiency value multiplied by a speed of the engine by either the manifold filling constant or manifold unfilling constant to obtain a K-factor; and using the K-factor to modify spark of the engine.

* * * * *